United States Patent
Convisser et al.

(10) Patent No.: US 9,133,782 B1
(45) Date of Patent: Sep. 15, 2015

(54) SYSTEM AND METHOD OF MULTI-FUEL ENGINE CONTROL

(75) Inventors: Claude D. Convisser, Sante Fe, NM (US); Abel R. Teller, Albuquerque, NM (US)

(73) Assignee: PLANT OIL POWERED DIESEL FUEL SYSTEMS, INC., Albuquerque, NM (US)

( * ) Notice: Subject to any disclaimer, the term of this patent is extended or adjusted under 35 U.S.C. 154(b) by 534 days.

(21) Appl. No.: 13/430,396

(22) Filed: Mar. 26, 2012

Related U.S. Application Data (60) Provisional application No. 61/467,118, filed on Mar. 24, 2011.

(51) Int. Cl.
*F02D 41/30* (2006.01)
*F02D 41/00* (2006.01)
*F02D 41/04* (2006.01)

(52) U.S. Cl.
CPC .......... *F02D 41/0025* (2013.01); *F02D 41/045* (2013.01); *F02D 41/047* (2013.01); *F02D 2250/26* (2013.01); *Y02T 10/36* (2013.01); *Y02T 10/46* (2013.01)

(58) Field of Classification Search
CPC . F02D 41/0025; F02D 2250/00; Y02T 10/36; Y02T 10/46
USPC ................. 701/102–106, 110, 111, 114, 115; 123/1 A, 27 GE, 295, 299, 305, 525, 123/526, 575–578, 406.16
See application file for complete search history.

(56) References Cited

U.S. PATENT DOCUMENTS

| | | | |
|---|---|---|---|
| 4,945,881 A | 8/1990 | Gonze et al. | |
| 4,955,345 A | 9/1990 | Brown et al. | |
| 5,139,002 A * | 8/1992 | Lynch et al. | 123/575 |
| 5,271,370 A * | 12/1993 | Shimada et al. | 123/25 A |
| 6,848,416 B1 * | 2/2005 | Pien | 123/305 |
| 7,296,555 B2 * | 11/2007 | Tamma et al. | 123/304 |
| 7,360,522 B2 * | 4/2008 | Tamma et al. | 123/299 |
| 7,996,147 B2 | 8/2011 | Gokhale | |
| 2002/0152985 A1 | 10/2002 | Wolff | |
| 2006/0042587 A1 * | 3/2006 | Ellinger et al. | 123/305 |
| 2006/0266020 A1 * | 11/2006 | Okamoto et al. | 60/284 |
| 2008/0196392 A1 | 8/2008 | Stroira et al. | |

* cited by examiner

*Primary Examiner* — John Kwon
*Assistant Examiner* — Johnny H Hoang
(74) *Attorney, Agent, or Firm* — Birch, Stewart, Kolasch & Birch, LLP (57) ABSTRACT

A system controlling a multi-fuel compression ignition engine includes a crankshaft position sensor, an electronic control module for receiving an original time signal from the crankshaft position sensor and signaling the fuel injectors when to inject fuel into the combustion chamber in relation to when each piston is at top-dead-center, an injection pulse duration, and quantity and pressure under which the fuel is injected, and an electronic phase adjustor module for intercepting the time signal before it reaches the electronic control module, and when the fuel supplied to the engine is other than 100% No. 2 diesel or petroleum diesel fuel. The electronic phase adjustor module generates a revised time signal relative to time signal in terms of degrees of rotation of the crankshaft, so that when the engine is running on other than 100% No. 2 diesel or petroleum diesel fuel, harmful exhaust emissions are minimized.

13 Claims, 9 Drawing Sheets

CRITERIA EMISSIONS AND MASS CARBON BALANCE FOR NO. 2 DIESEL v. VEGETABLE OIL FUEL UTILIZING POP DIESEL™ COMBUSTION STRATEGY

| | | 100% NO. 2 DIESEL BASELINE | 100% VO, INJECTION TIMING FOR NO. 2 DIESEL | 100% VO, INJECTION TIMING OPTIMIZED FOR VO | INJECTION TIMING, DEGREES FF-SET FROM NO. 2 DIESEL BASELINE TIMING: R = RETARDED A = ADVANCED |
|---|---|---|---|---|---|
| MODE 1 1800 RPM 100% LOAD | OXIDES OF NITROGEN-NOx (g/bhp-hr) | 4.005 | 5.525 | 4.189 | R-10 |
| | NITRIC OXIDE-NO (g/bhp-hr) | 3.569 | 4.955 | 4.229 | |
| | CARBON BALANCE (g) | 8.800 | NA | 7.367 | |
| | CARBON DIOXIDE-CO2 (g/bhp-hr) | 571.233 | 566.3 | 599.833 | |
| | SOOT (mg/bhp-hr) | 293.993 | 75.84 | 83.770 | |
| | TOTAL HYDRO CARBONS-HC (g/bhp-hr) | 0.345 | 0.320 | 0.753 | |
| | CARBON MONOXIDE-CO (g/bhp-hr) | 28.360 | 13.140 | 10.567 | |
| MODE 2 1800 RPM 25% LOAD | OXIDES OF NITROGEN-NOx (g/bhp-hr) | 1.898 | 2.335 | 3.019 | A-3 |
| | NITRIC OXIDE-NO (g/bhp-hr) | 1.698 | 2.085 | 3.052 | |
| | CARBON BALANCE (g) | 146.100 | NA | 148.200 | |
| | CARBON DIOXIDE-CO2 (g/bhp-hr) | 619.233 | 643.4 | 632.700 | |
| | SOOT (mg/bhp-hr) | 0.890 | 227.14 | 178.213 | |
| | TOTAL HYDRO CARBONS-HC (g/bhp-hr) | 1.056 | 0.690 | 1.088 | |
| | CARBON MONOXIDE-CO (g/bhp-hr) | 5.459 | 4.860 | 3.370 | |
| MODE 3 1800 RPM 50% LOAD | OXIDES OF NITROGEN-NOx (g/bhp-hr) | 7.037 | 11.250 | 4.962 | R-10 |
| | NITRIC OXIDE-NO (g/bhp-hr) | 6.247 | 9.925 | 5.015 | |
| | CARBON BALANCE (g) | 42.967 | NA | 43.600 | |
| | CARBON DIOXIDE-CO2 (g/bhp-hr) | 551.167 | 550.0 | 614.500 | |
| | SOOT (mg/bhp-hr) | 15.560 | 2.45 | 71.160 | |
| | TOTAL HYDRO CARBONS-HC (g/bhp-hr) | 0.336 | 0.185 | 0.650 | |
| | CARBON MONOXIDE-CO (g/bhp-hr) | 2.124 | 0.410 | 2.749 | |

| Mode | Constituent | Value 1 | Value 2 | Value 3 | Notes |
|---|---|---|---|---|---|
| MODE 4<br>2400 RPM<br>100% LOAD | OXIDES OF NITROGEN-NOx (g/bhp-hr)<br>NITRIC OXIDE-NO (g/bhp-hr)<br>CARBON BALANCE (g)<br>CARBON DIOXIDE-CO2 (g/bhp-hr)<br>SOOT (mg/bhp-hr)<br>TOTAL HYDRO CARBONS-HC (g/bhp-hr)<br>CARBON MONOXIDE-CO (g/bhp-hr) | 5.496<br>4.744<br>74.567<br>542.467<br>267.440<br>0.100<br>15.845 | 7.150<br>6.180<br>NA<br>549.9<br>122.17<br>0.170<br>8.385 | 4.205<br>4.224<br>83.567<br>631.267<br>403.987<br>0.214<br>18.680 | R-13 |
| MODE 5<br>2400 RPM<br>25% LOAD | OXIDES OF NITROGEN-NOx (g/bhp-hr)<br>NITRIC OXIDE-NO (g/bhp-hr)<br>CARBON BALANCE (g)<br>CARBON DIOXIDE-CO2 (g/bhp-hr)<br>SOOT (mg/bhp-hr)<br>TOTAL HYDRO CARBONS-HC (g/bhp-hr)<br>CARBON MONOXIDE-CO (g/bhp-hr) | 3.525<br>3.078<br>207.7<br>612.5<br>1.54<br>0.634<br>2.855 | 3.750<br>3.295<br>NA<br>633.8<br>5.66<br>0.385<br>1.985 | 3.571<br>3.591<br>243.6<br>627.7<br>8.10<br>0.463<br>2.092 | 0 |
| MODE 6<br>2400 RPM<br>50% LOAD | OXIDES OF NITROGEN-NOx (g/bhp-hr)<br>NITRIC OXIDE-NO (g/bhp-hr)<br>CARBON BALANCE (g)<br>CARBON DIOXIDE-CO2 (g/bhp-hr)<br>SOOT (mg/bhp-hr)<br>TOTAL HYDRO CARBONS-HC (g/bhp-hr)<br>CARBON MONOXIDE-CO (g/bhp-hr) | 5.282<br>4.617<br>60.667<br>535.533<br>5.263<br>0.308<br>0.369 | 8.360<br>7.265<br>NA<br>549.6<br>1.18<br>0.110<br>0.265 | 4.605<br>4.634<br>61.967<br>638.267<br>4.397<br>0.287<br>0.860 | R-13 |
| AVERAGE OF EACH CONSTITUENT ACROSS ALL 6 MODES | OXIDES OF NITROGEN-NOx (g/bhp-hr)<br>NITRIC OXIDE-NO (g/bhp-hr)<br>CARBON BALANCE (g)<br>CARBON DIOXIDE-CO2 (g/bhp-hr)<br>SOOT (mg/bhp-hr)<br>TOTAL HYDRO CARBONS-HC (g/bhp-hr)<br>CARBON MONOXIDE-CO (g/bhp-hr) | 4.540<br>3.992<br>90.128<br>572.017<br>97.447<br>0.463<br>9.169 | 6.395<br>5.618<br>NA<br>582.133<br>72.405<br>0.310<br>4.841 | 4.092<br>4.124<br>98.044<br>624.050<br>124.938<br>0.576<br>6.386 | |

SYSTEM AND METHOD OF MULTI-FUEL ENGINE CONTROL

CROSS-REFERENCE TO RELATED APPLICATION

The present application claims priority under 35 U.S.C. §120 to U.S. Provisional Application No. 61/467,118, filed Mar. 24, 2011. The entire contents of the above-identified application are hereby incorporated by reference.

BACKGROUND OF THE INVENTION

1. Field of the Invention

The present invention relates to the field of compression ignition (diesel) engine engineering, and more particularly to the field of controls and control systems for optimizing engine performance in a multi-fuel compression ignition engine suitable for use in automotive, marine, locomotive; mining, construction, agricultural, electricity generation and all other applications for compression ignition engines.

2. Description of Background Art

Every compression ignition engine comes equipped with a combustion strategy, a set of control parameters to the engine directing if, when, how, for how long, and how frequently to inject fuel and air into the cylinder combustion chamber. The combustion strategy of a contemporary compression ignition engine is embodied in an electronic control module (ECM) or power control module (PCM), which contains a set of fuel maps setting the engine control parameters for as many as fifteen to twenty different sets of operating conditions, such as engine start-up, idle, heavy load, high altitude, cold ambient temperature, and post start-up default.

Engine fuels, such as petroleum diesel; biofuels including biodiesel and triglycerides (consisting of vegetable oil and animal fat); and/or synthetic fuels derived from processes like Fischer-Tropsch can vary in such physical or chemical characteristics as their viscosity, density (specific gravity), thermal energy (calories or BTU's per pound, kilogram, gallon or liter), bulk modulus of compressibility, lubricity, and the relative complexity of the hydrocarbon molecules at which they release their energy during combustion. Given the same combustion strategy, or set of combustion commands, the physical or chemical properties of different fuels can in turn affect the timing and characteristics of combustion in a compression ignition engine. As an example, given a constant combustion strategy, different fuel types can affect operating parameters, such as the timing of fuel injections; the duration of injections; the quantity of fuel injected into the cylinder combustion chamber by each injection prior to, during, and after the piston reaches top-dead-center in the cylinder combustion chamber; the power output of the engine; and the composition and quantity of emissions from the combustion process.

Some compression ignition engines are equipped with a fuel system that alternates between two or more different diesel fuel types while the engine is operating. Accordingly, in a fuel system that alternates between two or more different fuel types having different physical or chemical properties, a need arises to vary the combustion strategy by affecting one or more engine control parameters according to which one of the fuels, or which combination of the two fuels, is presently supplying the fuel to the compression ignition engine.

SUMMARY AND OBJECTS OF THE INVENTION

The objective of the present invention is to provide a multi-fuel control system enabling compression ignition engines to operate and maintain performance under a wide variety of operating conditions, while minimizing harmful exhaust emissions, thereby addressing the shortcomings of conventional multi-fuel systems designed to run on only one type of fuel.

According to an embodiment of the present invention, a system for controlling a compression ignition combustion engine capable of using multiple fuels includes at least one fuel tank for providing a fuel to a fuel injector of the engine, a sensor for detecting an attribute of a movement of an injector needle of the fuel injector as the fuel is being injected into a cylinder combustion chamber while the engine is operating, and an electronic control module (ECM) having a plurality of fuel maps, each of which enables the electronic control module (ECM) to generate a control parameter for setting one or more operating functions of the engine so that oxides of nitrogen and nitric oxide emissions from the engine are less than a predetermined threshold. The electronic control module (ECM) detects an attribute of the signal from the sensor and, based on the detected attribute of the signal, the electronic control module (ECM) selects a particular one of the fuel maps, and transmits to the engine the control parameter corresponding to the particular fuel map, so that the oxides of nitrogen and nitric oxide emissions from the engine are less than the predetermined threshold.

According to an embodiment of the present invention, a system for controlling exhaust emissions from a compression ignition engine capable of using multiple fuels drawn from separate fuel storage tanks includes a crankshaft position sensor (CPS) for detecting a predetermined position of a crankshaft of the engine and sending a time signal when the position is detected; an electronic control module (ECM) for receiving an original time signal (T0) from the crankshaft position sensor (CPS) and separately signaling fuel injectors when to inject fuel into a cylinder combustion chamber in relation to when each piston is at top-dead-center in the chamber, a duration of the fuel injection (pulse), a pressure under which the fuel is injected, and a quantity of fuel injected; and an electronic phase adjustor module for intercepting the original time signal (T0), when the fuel supply to the engine is 100% alternative fuel, or is a mixture or blend of alternative fuel and No. 2 diesel or petroleum diesel fuel, before this fuel reaches the electronic control module (ECM). The electronic phase adjustor module is adapted to generate a revised time signal (T1, T2, . . . Tn) that is either retarded or advanced from the original time signal (T0) in terms of degrees of rotation of the crankshaft, and to send the revised time signal (T1, T2, . . . Tn3) to the electronic control module (ECM), which then sends predetermined settings corresponding to the revised timing signal (T1, T2, . . . Tn) to the fuel injectors to set the timing of fuel injection when the fuel supply to the engine is 100% alternative fuel, or is a blend of alternative fuel and No. 2 diesel or petroleum diesel fuel, so that when the engine is running on 100% alternative fuel or a mixture or blend of alternative fuel and No. 2 diesel or petroleum diesel fuel, one or more harmful emissions are minimized and reduced to a level substantially equal a level of the one or more harmful emissions when the engine is running on only 100% No. 2 diesel or petroleum diesel fuel.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
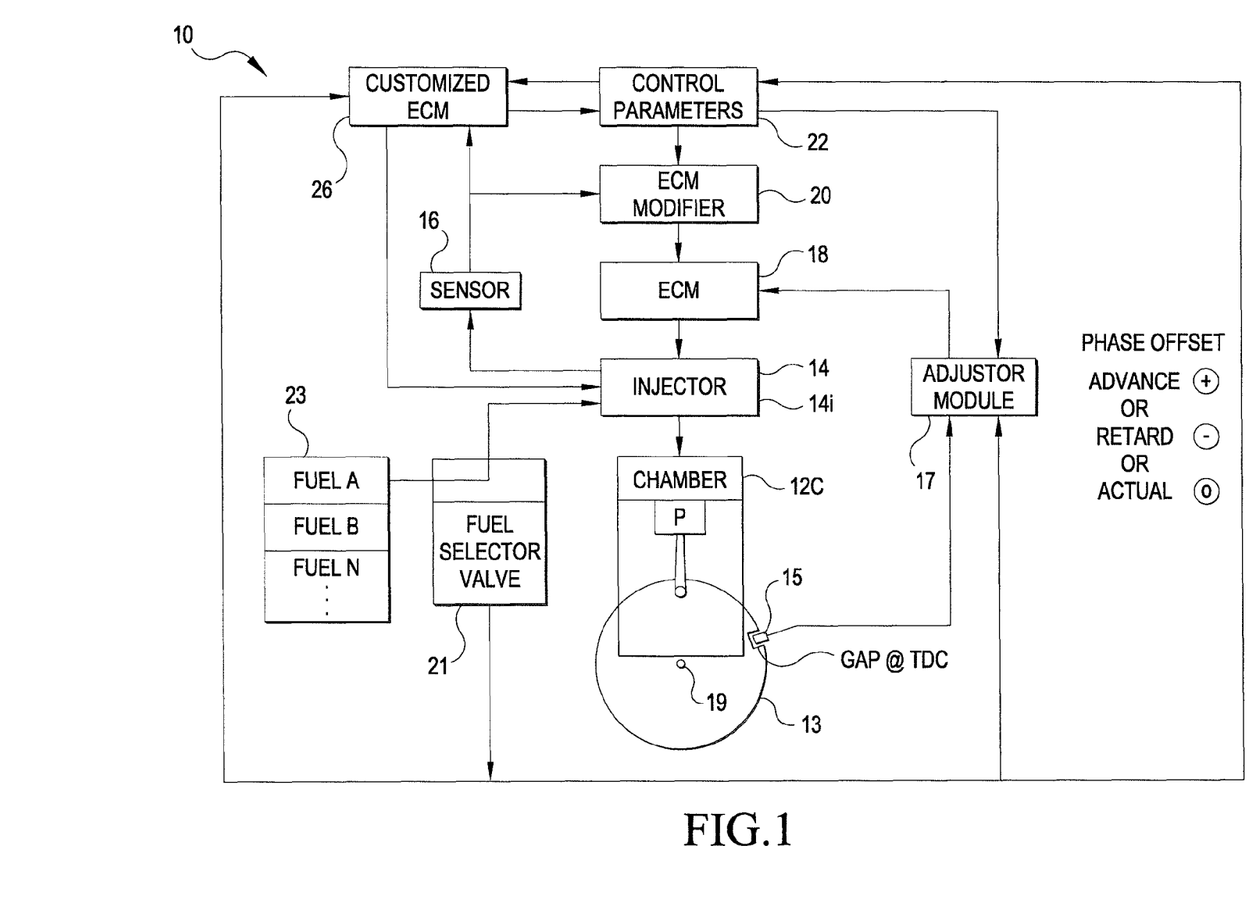
FIG. 1 is a schematic diagram of components included in a fuel supply control system for a compression ignition engine in accordance with the present invention.

FIG. 1 illustrates a fuel supply control system 10 for piston compression ignition engine 12 capable of using multiple fuels. Alternatively, the compression ignition engine 12 of the system can be any other type of mechanical compression ignition engine, such as a Wankel rotary compression ignition engine. The piston compression ignition engine 12 includes one or more fuel injectors 14 with an injector needle 14i, one or more lift sensors 16, two or more fuel tanks 23 for storing fuels A, B, . . . N, one or more fuel pumps (not shown) and/or a common rail (not shown) for distributing combustible fuels into the combustion chambers 12C of the compression ignition engine 12. ECM 18 enables the engine to be controlled in either of Control Mode 1 or Control Mode 2 (as described later) by outputting specific control parameters 22 for controlling the injection of the fuel supply to the combustion chamber 12C of engine 12, based on how the ECM is set to operate by a user, a fuel selector valve 21, and/or by signals received from one or more sensors which detect various operating characteristics of the fuel. Crankshaft position sensor 15 is mounted near crankshaft tone wheel 13 (which rotates with crankshaft 19) and measures each rotation of the crankshaft 19 of the engine 12 and sends timing signal T to ECM 18 via timing adjustor module 17 when the crankshaft is in a position corresponding to a top-dead-center of piston P of the engine 12. As will be described later, the ECM 18 controls the fuel supply to the engine depending on whether the fuel used in the engine is 100% No. 2 diesel or petroleum diesel fuel, 100% vegetable oil (VO) fuel, 100% biodiesel fuel, or a mixture or blend of No. 2 diesel and either one of these biofuels.

Control Mode 1 of the Fuel Supply Control System

Control Mode 1 of fuel supply control system 10 is described below:

System 10 includes one or more sensors 16 connected to the one or more fuel injectors 14. The sensors 16 are adapted to determine one or more physical properties of the fuel being supplied to the compression ignition engine 12. Examples of physical properties of the fuel can include viscosity, density, quantity of thermal energy, pace of heat release during combustion, bulk modulus of compressibility, and/or lubricity. As used herein, the term "physical property" should be understood to denote all physical and/or chemical properties of the subject material. In a first alternative of Control Mode 1, the sensor 16 can include a lift sensor 16 that cooperates with the fuel injector 14 to detect and send an output signal corresponding to variations in the lubricity or the isentropic bulk modulus of compressibility of the fuel that is supplying the injector. In one variation of the first alternative embodiment, the lift sensor is disposed inside the injector body, although other suitable locations can be arranged as a matter of design choice.

In the first alternative of Control Mode 1 of system 10, sensor 16 can function as a Hall effect sensor. In a typical fuel injector 14 suitable for use in system 10, the injector needle 14i, plunger and piston move up and down to allow fuel to pass through holes in the injector nozzle into the cylinder combustion chamber 12C and to cut off the supply of fuel passing through the nozzle holes into the cylinder combustion chamber 12C. As the metallic injector needle 14i, plunger and piston P move up and down, they generate variations in a Hall effect electromagnetic charge, which the sensor 16 can detect. The magnitude, duration, timing and quality of this electromagnetic Hall effect can be a function of the ease, responsiveness, speed, height or magnitude of movement of the injector needle 14i, plunger and piston P, which movement is affected by and corresponds to the lubricity of the fuel or the speed of the sound/pressure wave traveling from the fuel pump or the mechanical or electrical unit injector 14 (depending on the type of fuel system in use in system 10) through the fuel inside the injector 14. Assuming that the speed of sound in turn is largely a function of the bulk modulus of compressibility of the particular fuel, then the sensor 16 of system 10 can identify different types of fuels in response to each measured bulk modulus of compressibility. The sensor 16 of system 10 can also identify different types of fuels in response to each measured lubricity and how such lubricity affects the movement of the injector needle 14i and creates a resulting, identifying Hall effect trace.

System 10 further includes an ECM 18 that is connected to the one or more sensors 16 and configured to receive signals from the sensor 16 indicative of a measured physical property of the fuel, i.e., an electrical signal indicative of the lubricity or bulk modulus of compressibility of the fuel. The ECM 18 of system 10 can be a standard ECM available from one or more original equipment manufacturers. System 10 can also include an ECM modifier 20, which can be configured as a software module or addition, that is connectable to or integratable within ECM 18 so as to modify the ECM 18 for the particular functions set forth herein. The ECM 18 and/or ECM modifier 20 function to receive signals from the one or more sensors 16, indicative of a physical property of a fuel (i.e., a fuel type or blend/mixture) and generate and/or implement one or more control parameters 22 in response thereto. The control parameters 22 of system 10 may be configured as so-called "fuel maps" to operate under a particular set of operating conditions, including a predetermined set of instructions for performance of the various functions of compression ignition engine 12, such as for example the timing of the fuel ignition.

Fuel maps for system 10 are created by using data such as that in Table 1 which is included on a later section of this application. For example, Table 1 illustrates how injection timing would be advanced or retarded by the number of degrees specified in the far right column of Table 1 that would apply when the engine is running on 100% alternative fuel as compared to when the engine is running No. 2 diesel or petroleum diesel fuel (under the same operating conditions (rpm, torque, etc.)).

The fuel maps can be calibrated to a particular kind or mixture of fuel with physical and chemical properties within a distinct, given or known range, such that the one or more control parameters 22 are pre-programmed as a computer algorithm into the ECM 18.

In a second alternative of Control Mode 1 of system 10, sensor 16 is connected to a customized ECM 26 configured specifically for performing the functions set forth herein. Customized ECM 26 functions to receive signals from the one or more sensors 16 indicative of a physical property of a fuel (i.e., a fuel type or blend/mixture), and generate and/or implement one or more control parameters 22 in response thereto. Customized ECM 26 can include for example a standard ECM that has been modified, retrofitted, or reprogrammed to optimize the performance of the compression ignition engine 12, in response to the one or more control parameters 22, described below.

System 10 also includes one or more control parameters 22 generated in whole or in part by ECM 18 and/or ECM modifier 20 or the customized ECM 26. The control parameters 22 function to control various aspects of the compression ignition engine 12, such as, for example, a frequency and timing of injections; a duration of injections; and a quantity of fuel injected into the cylinder combustion chamber 12C by each injection prior to, during, and after a piston P reaches top-dead-center in the cylinder. In response to the type of fuel being injected into the compression ignition engine 12, variation of the one or more control parameters 22 can in turn function to modify various outputs of the compression ignition engine 12, such as, the brake horsepower and/or emissions type and quantity.

In a third alternative of Control Mode 1, the one or more control parameters 22 of system 10 is configured as a "fuel map" to operate under a particular set of operating conditions, including a predetermined set of instructions for performance of the various functions of compression ignition engine 12, such as for example the timing of the fuel ignition. One or more fuel maps can be calibrated to a particular kind or mixture of fuel with physical and chemical properties within a distinct, given or known range, such that the one or more control parameters 22 are pre-programmed as a computer algorithm into the ECM 18 and/or ECM modifier 20 or customized ECM 26. One or more distinct fuel maps M, or distinct set of fuel maps for the range of operating conditions (i.e., start-up, idle, heavy load, high altitude, cold ambient temperature, and post start-up default), can be selected and/or generated at a predetermined interval, continuously, or in response to a predetermined input such as a transition in fuel type by the user via a fuel selector valve 21, i.e., if the user switches compression ignition engine 12 from a petro diesel source to a biofuel source, or some combination of fuels thereof.

Referring again to FIG. 1, system 10 includes two or more fuel tanks 23 from which the user and/or control parameters can select, such as for example fuels A, B, N, each of which fuels A-N can have its own physical properties measurable by the sensor 16 and controllable by ECM 18 and/or ECM modifier 20 or the customized ECM 26. As an example, the compression ignition engine 12 of system 10 can be configured to run on petro diesel, biofuel and/or a combination thereof, each of which can have its own physical properties that can be measured by sensor 16 and controlled by the ECM 18 and/or ECM modifier 20 or the customized ECM 26.

Some alternative engine fuels derived from biological material (biofuels), such as biodiesel or triglyceride fuel, have a consistently better or higher lubricity or higher bulk modulus of compressibility than the grade of petroleum diesel that is typically used in a compression ignition engine, No. 2 diesel (so named if it complies with ASTM D975, Standard Specification for Diesel Fuel Oils). This higher lubricity or bulk modulus can correlate with an advance in fuel injection timing, meaning that the release of heat from combustion that powers the compression stroke of the diesel engine piston cycle (intake-compression-combustion-exhaust) occurs earlier or sooner than it would than if the fuel were No. 2 diesel. A fuel with a higher bulk modulus will transmit a sound or pressure wave passing through it faster than will a fuel with a lower bulk modulus. In other words, a fuel with a higher bulk modulus allows for more responsive and faster transmission of the wave generated by the mechanical movement of the fuel pump or the injector valve 14, piston and needle 14$i$. Accordingly, the sensor 16 of system 10 is adapted to determine the ease, responsiveness or speed of movement of the injector needle 14$i$, plunger and piston, which movement is affected by and corresponds to the speed of the sound/pressure wave traveling from the fuel pump or the mechanical or electrical unit injector 14 (depending on the type of fuel system in use in the engine) through the fuel inside injector 14, which speed of sound in turn is largely a function of the particular bulk modulus of compressibility of the fuel supply.

Therefore, the sound or pressure wave initiated by a mechanical source that causes or enables an injection of a fuel that has a higher bulk modulus will reach the holes or ports at the end of the injector nozzle faster than the same wave would reach the holes and ports by traveling through a fuel that has a lower bulk modulus. Given all other factors constant, a fuel with a higher bulk modulus will be injected into the cylinder compression chamber earlier than a fuel with a lower bulk modulus.

In a common rail fuel system, in which the fuel in the common rail and the injectors is under high pressure, the lubricity of the fuel will have a bearing on the speed with which the height to which the injector needle will lift when it releases fuel through the holes in the bottom of the injector nozzle into the cylinder combustion chamber. Because biofuels, such as biodiesel and triglycerides, have a better or higher degree of lubricity than No. 2 diesel or petroleum diesel fuel, the injector needle may lift faster or higher than it would if the fuel were No. 2 diesel, leading to advanced fuel injection timing.

The advanced fuel injection timing associated with biofuels can produce an increase in undesirable nitrous oxide (NOX) emissions (including emissions of oxides of nitrogen and nitric oxide). Therefore, system 10 can adapt to the use of certain biofuels by retarding the injection timing to compensate for the biofuel's higher bulk modulus of compression, thereby substantially diminishing or eliminating the biofuel's typical increased nitrous oxide emissions. Similarly, paraffinic fuels such as Fischer-Tropsch diesel fuels have a consistently lower bulk modulus of compressibility that correlates with delayed fuel injection timing and, seemingly as a result, lower nitrous oxide emissions.

In other operating circumstances, the fact that triglycerides release their energy later in each combustion event, due to the fact that they store more of their energy in Carbon-16 and Carbon-18 hydrocarbon molecules and less of their energy in the less-complicated hydrocarbon molecules than does petroleum diesel, will require an advance of the fuel injection timing to prevent higher nitrous oxide emissions or other harmful emissions.

Accordingly, the one or more control parameters 22 of system 10 can include injection timing controls that are directed to a particular type of fuel, or a blend/mixture of two or more fuels, wherein the injection timing controls can be optimized in response to the physical properties of the fuel input, such as the bulk modulus of compressibility of the fuel or blend/mixture. As noted above in the third alternative of Control Mode 1 of system 10, the one or more control parameters 22 can be configured as a fuel map including at least injection controls customized for each particular type of fuel and/or blend/mixture.

In a fourth alternative of Control Mode 1 of system 10 having fuels A-N and blend/mixtures of fuels A-N, the one or more control parameters 22 can include a separate and distinct fuel map or set of fuel maps for each fuel and/or blend/mixture. Alternatively, the one or more control parameters 22 can include a set of distinct fuel maps for a subset of each fuel and/or blend/mixture, wherein each subset of fuel and/or blend/mixture is within a predetermined range of ignition timing so as to provide optimized operating conditions without requiring a separate fuel map for each permutation of fuels A through N.

It should be apparent to those of skill in the art that various aspects of system can be varied without departing from the scope of the present invention. For example, system 10 illustrates a particular configuration in which the sensor 16 functions to measure a physical property of the fuel, such as a bulk modulus of compressibility or the lubricity, at the fuel injector 14. System 10 can include other sensors as well, in lieu of or in addition to the sensors 16 described herein, that are adapted to measure the same or other physical properties of the fuel.

As a non-limiting example, system 10 can include a NOX sensor (not shown) at or near the exhaust manifold of the compression ignition engine 12 that is adapted to determine a NOX volume released subsequent to the combustion of the fuel. As noted herein, there can be a correlation between a fuel's NOX level (a physical property), and its chemical makeup. As an example, a higher NOX level can identify a fuel as being entirely or primarily a biofuel while a lower NOX level can identify a fuel as being entirely or primarily a synthetic Fischer-Tropsch fuel. The ECM 18 and/or ECM modifier 20 or customized ECM 26 of system 10 can adjust the one or more control parameters 22 in response to a determination or identification of a fuel type or blend/mixture based upon an exhaust-type sensor/signal in the same fashion as it can based upon the injector sensor/signal described in detail herein.

Figure 2:
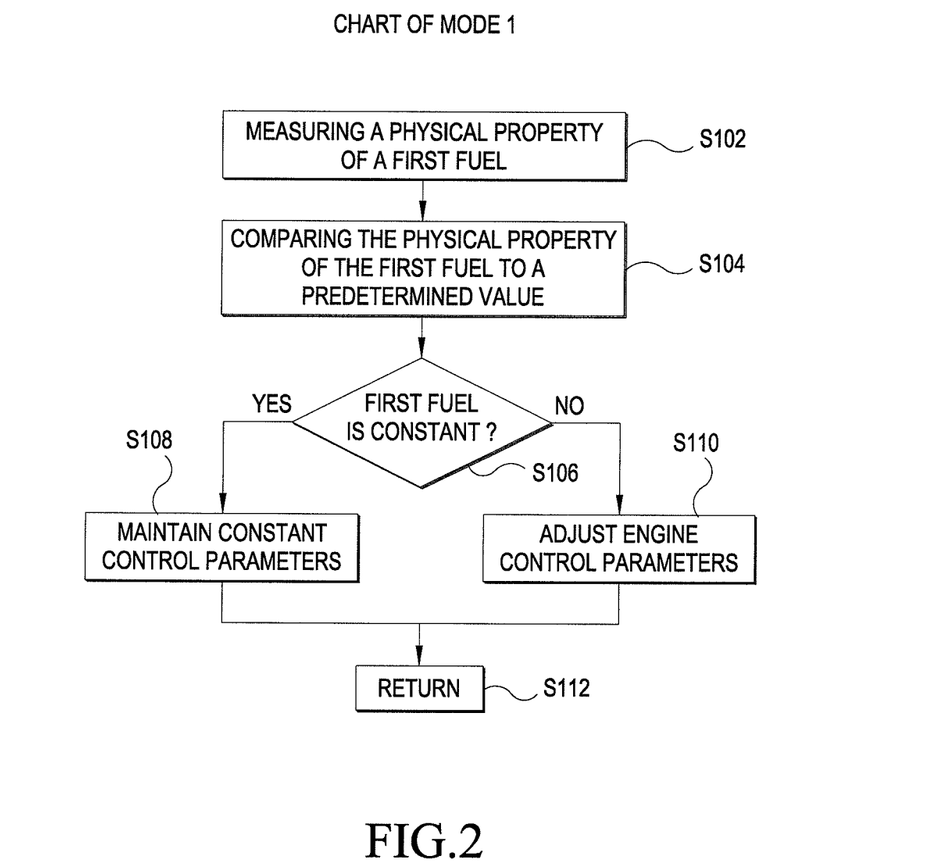
FIG. 2 is a flow chart depicting a method of Control Mode 1 of the fuel supply control system in accordance with the present invention.
Figure 3:
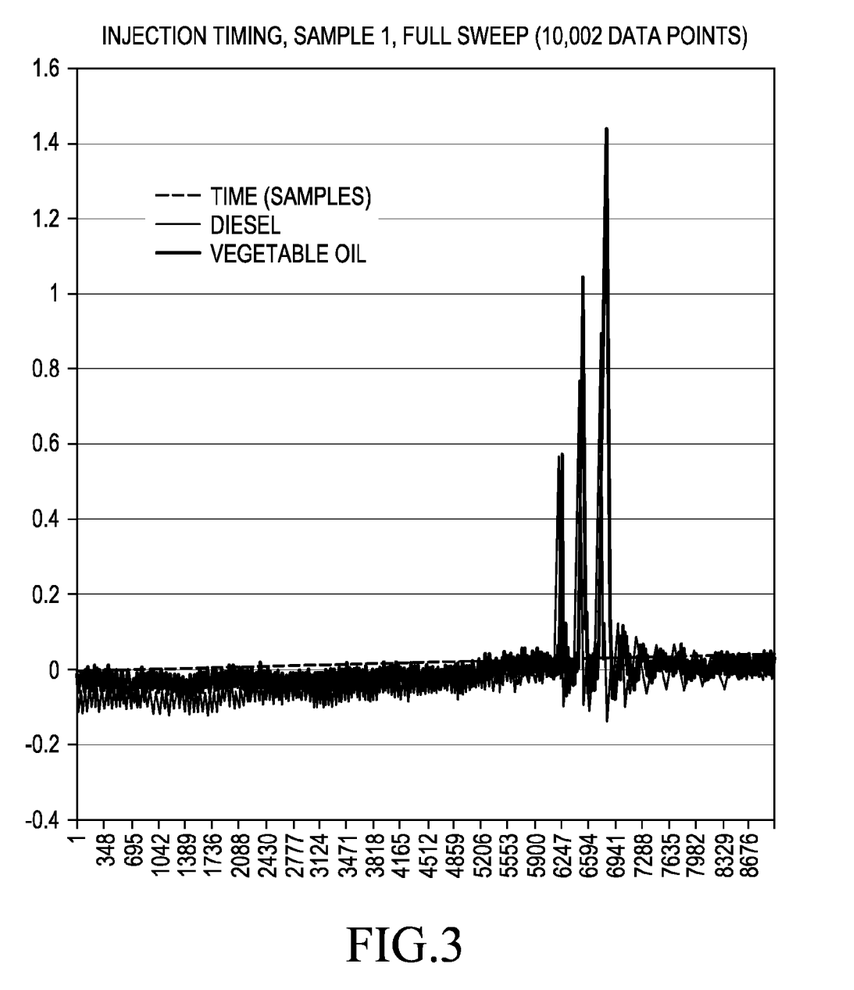
FIGS. 3-6 illustrate injector firing timing during Control Mode 1 operation of the fuel supply control system when the engine is using 100% No. 2 diesel vs. 100% vegetable or plant oil.
Figure 4:
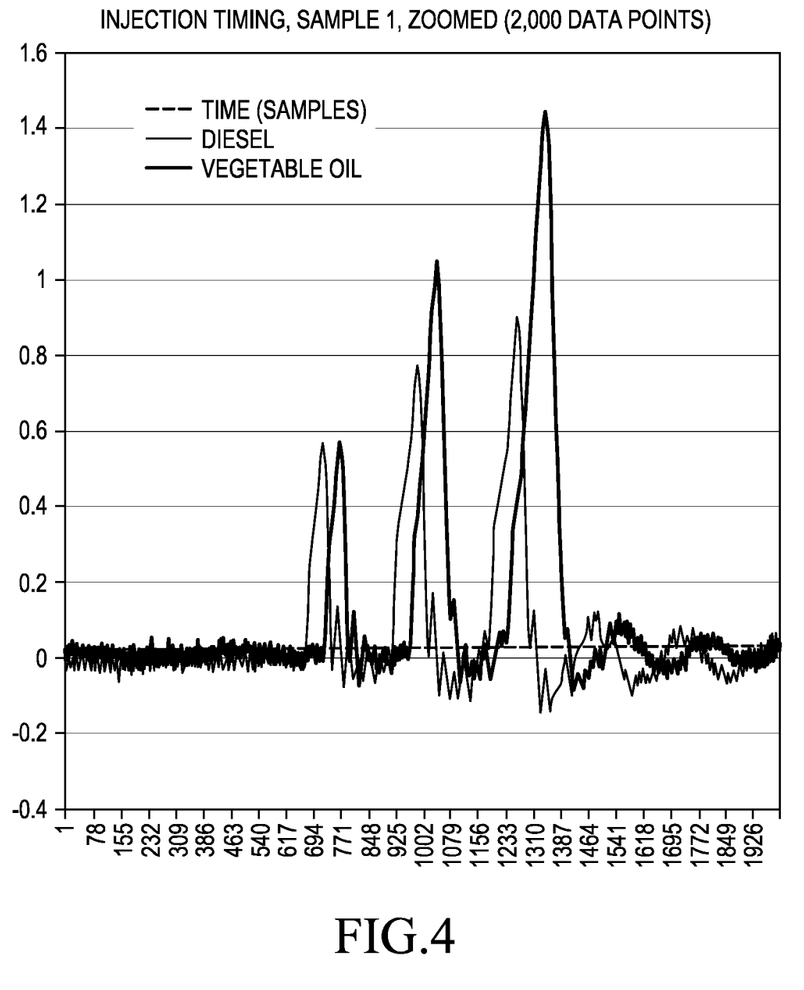
Figure 5:
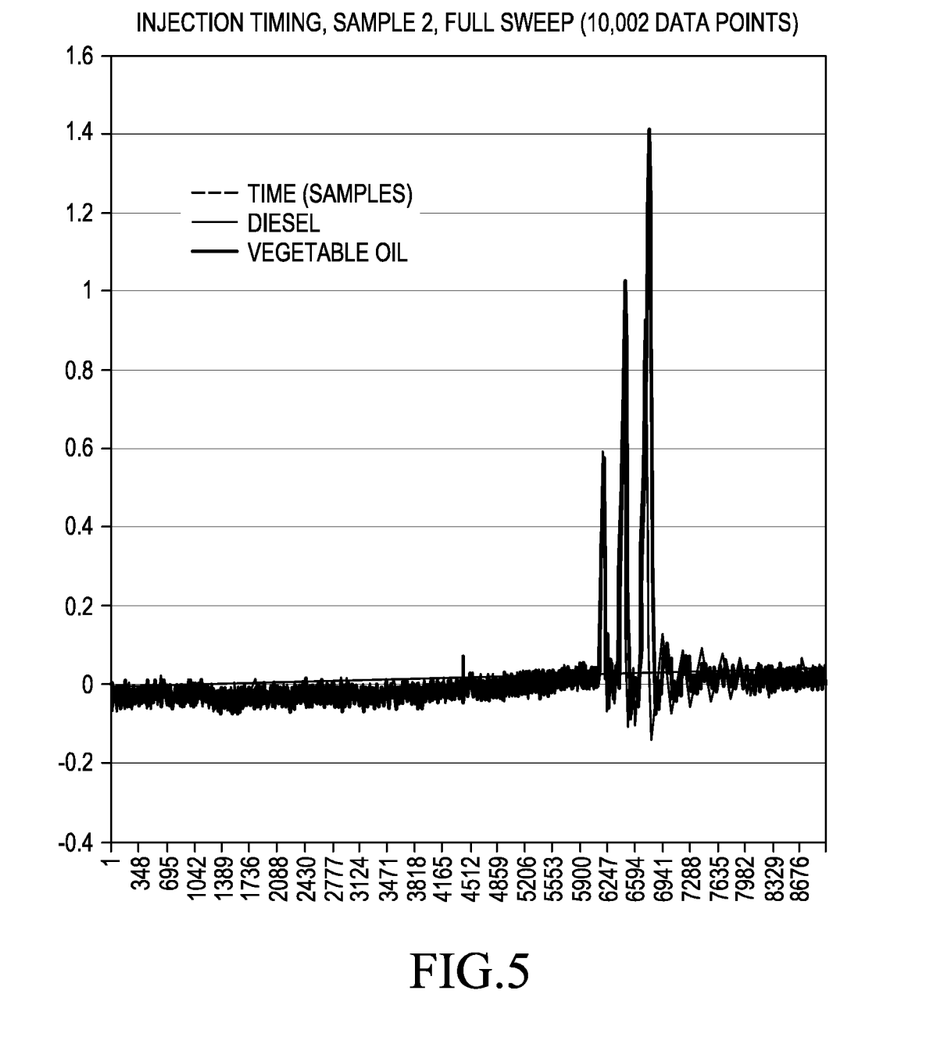
Figure 6:
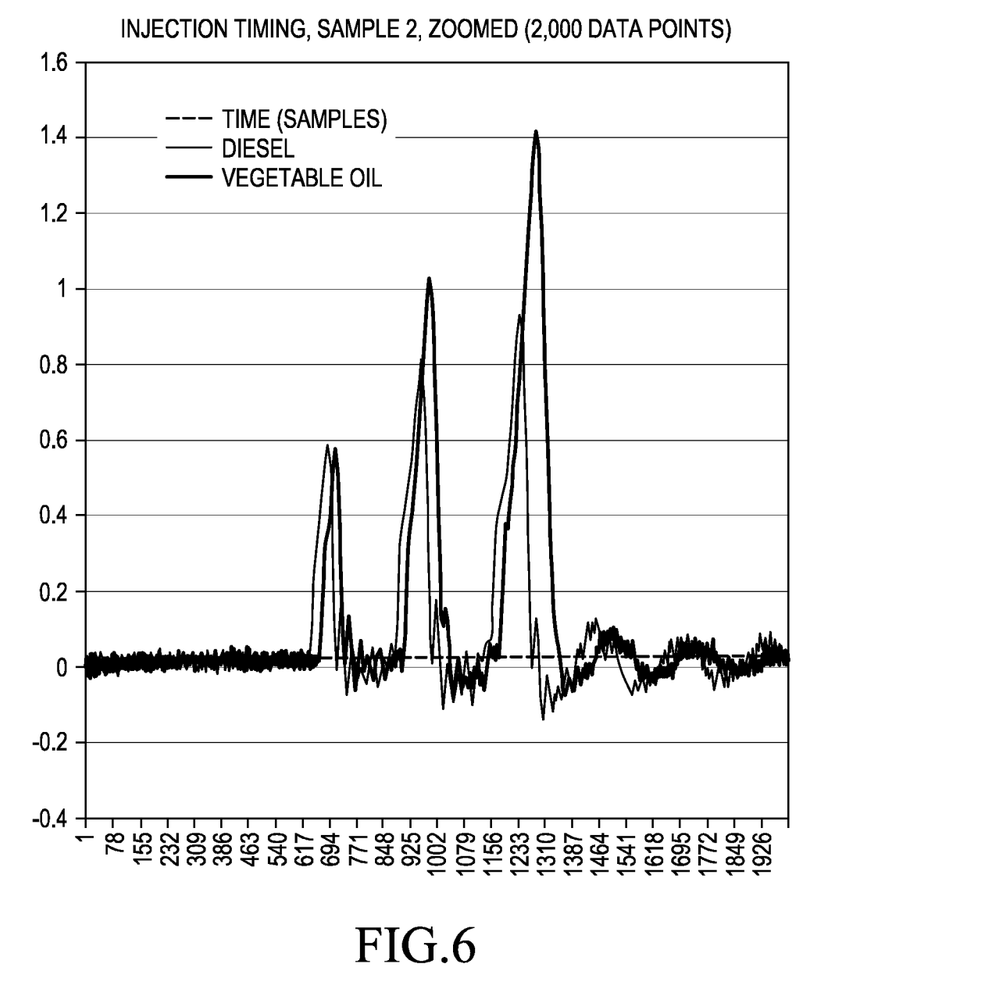

As shown in FIG. 2, a method of Control Mode 1 includes step S102, measuring a physical property of a first fuel. Examples of physical properties of the fuel can include for example viscosity, density, quantity of thermal energy, a pace of release of energy during combustion, bulk modulus of compressibility, emission type and/or quantity resulting from combustion or incomplete combustion of the fuel, and/or lubricity. As noted above, different types of fuels can have different physical properties and have differing effects on the performance of the compression ignition engine. As an example, there can be an inverse relationship between a fuel's bulk modulus of compressibility or its lubricity and its oxides of nitrogen and its nitric oxide emissions, which enables the method to differentiate between different types of fuels and blend/mixtures thereof.

Step S104 (FIG. 2) of the method of Control Mode 1 compares the physical property of the first fuel to a predetermined value. Decision block S106 of the method queries whether the first fuel is constant, i.e., whether it has changed since the prior measurement. If the fuel is constant based on the unchanging measurements of its physical property, then the method proceeds to step S108 in which the engine control parameters are maintained in their current state. If the fuel has changed based on the measurement of the physical property of the fuel, then the method proceeds to step S110, in which the engine control parameters are adjusted.

Accordingly, if the physical property is the bulk modulus of compressibility or the lubricity and that value has increased, then the method can adjust the engine control parameters to account for the expected advance in injection timing. Conversely, if the bulk modulus of compressibility or lubricity value has decreased, then the method can adjust the engine control parameters to account for the expected delay in injection timing. In this manner, the method can adjust in real time or near real time for changes in the type of fuel or blend/mixture thereof being supplied to the compression ignition engine. The method of Control Mode 1 ends with step S112 (see FIG. 2).

No. 2 Diesel—Vegetable Oil Dyno Test Result Comparisons (Control Mode 1)

Test: Low-Speed, Injector Firing Timing

Referring to the test data in FIGS. 3-6, injector firing timing during Control Mode 1 operation of the fuel supply control system when the engine is using 100% No. 2 diesel vs. 100% vegetable oil will be described below.

A digital storage oscilloscope (DSO) was used to capture and store the output of one custom fuel injector that includes an integrated magnetic flux sensor (Hall Effect device) to allow monitoring needle travel in real time. Due to the very low voltage levels produced by the sensor, a signal conditioning amplifier was used to boost the signals to produce measureable conditions for the oscilloscope.

Digital Storage Oscilloscope (DSO; LeCroy WaveSurfer 432) Setup:

The horizontal axis (time scale) was set for 50 milliseconds (mS) per sweep, full-scale (5 mS per division). 10,002 data points were stored for each sweep (data set), with multiple sweeps captured during the test period of approximately one minute-per-fuel type. These same settings were used for all of the tests that are summarized here.

A second oscilloscope input was connected to the ECM's crankshaft position sensor output. The magnetic crankshaft position sensor essentially counts the teeth on a crankshaft gear. To facilitate timing measurement and control via this method, the crankshaft gear is manufactured with one tooth "missing," resulting in a gap in the stream of pulses produced by the sensor as the crankshaft rotates; the gap represents zero degrees of rotation. The width of the gap varies as a function of crankshaft rotation speed, but may be used as a triggering event if the scope setup is adjusted for each test speed. The LeCroy DSO includes the functionality to trigger on a pulse that is over a programmable (user-configurable) threshold in the time domain; this function ("smart triggering") was used to allow triggering of the scope. The scope was triggered on the gap in the stream of pulses produced by the crankshaft gear and its missing tooth.

Test Conditions: An effort was made to establish consistent operating conditions for both tests.

Test Vehicle: 2008 Ford F250 with 6.4 liter diesel Powerstroke Engine.

Engine Speed: approximately 660 RPM (+/−TBD RPM).

Dyno Settings (load): approximately zero.

Coolant Temperature: approximately 180° F. at the start of the test.

Prior to beginning data capture, the test vehicle engine was allowed to run long enough to achieve and stabilize, to a reasonable degree, the conditions outlined above. After achieving the stated conditions, data capture was started and allowed to proceed for approximately one minute. The setup procedure was repeated for the two fuel types.

During this testing, the DSO produced over 100 data files for each fuel type; the following graphs represent three separate data capture samples of each fuel type; the results for each fuel type are overlaid here for the sole purpose of this presentation. The data presented on each graph depicts the passage of 5 milliseconds of time.

The output of injector sensor 16 was monitored to capture the injector firing events as relative to zero degrees of crankshaft rotation, in the time domain.

FIGS. 3 and 4 and FIGS. 5 and 6 represent two separate data capture samples of each fuel type; the results for each fuel type are overlaid in these FIGS. for the sole purpose of presentation. Due to the altered time scale, each data set is presented twice: once (FIGS. 3 and 5) with the full data set, and again (FIGS. 4 and 6) with fewer (2,000) data points included to allow better visual analysis of the injector sensor output data in the time domain.

Control Mode 2 of the Fuel Supply Control System

Figure 7:
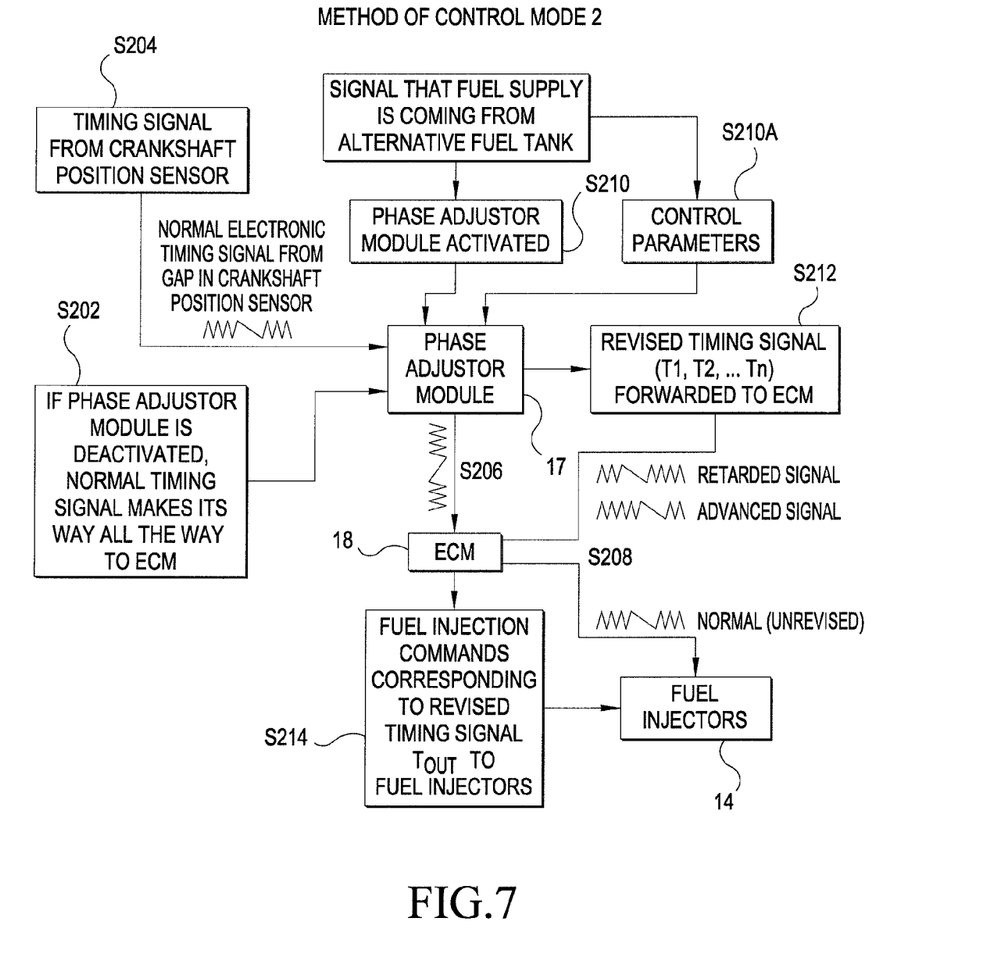
FIG. 7 is a flow chart depicting a method of Control Mode 2 of the fuel supply control system in accordance with the present invention.

Control Mode 2 of the fuel supply control system 10 of the present invention controls the timing of the fuel injection into the combustion chamber 12C based on whether the fuel is 100% No. 2 diesel fuel, 100% alternative fuel (bio-fuel), or a blend of No. 2 diesel fuel and alternative fuel, for example. Referring to FIGS. 1 and 7, in Control Mode 2, crankshaft position sensor 15 measures each rotation of the crankshaft of the engine 12 and sends timing signal T to ECM 18 via timing adjustor module 17 regarding when the crankshaft is in a position corresponding to a top-dead-center of piston P of the engine 12. (Timing signal T0 corresponds to the standard (baseline) timing when No. 2 diesel fuel is being used in the engine.) When the user sets ECM 18 to indicate that the engine 12 is using No. 2 diesel or petroleum diesel fuel, the timing adjustor module 17 merely sends timing signal T without change to the ECM 18, and ECM 18 controls the injection timing by control parameters corresponding to timing signal T0.

Figure 8A:
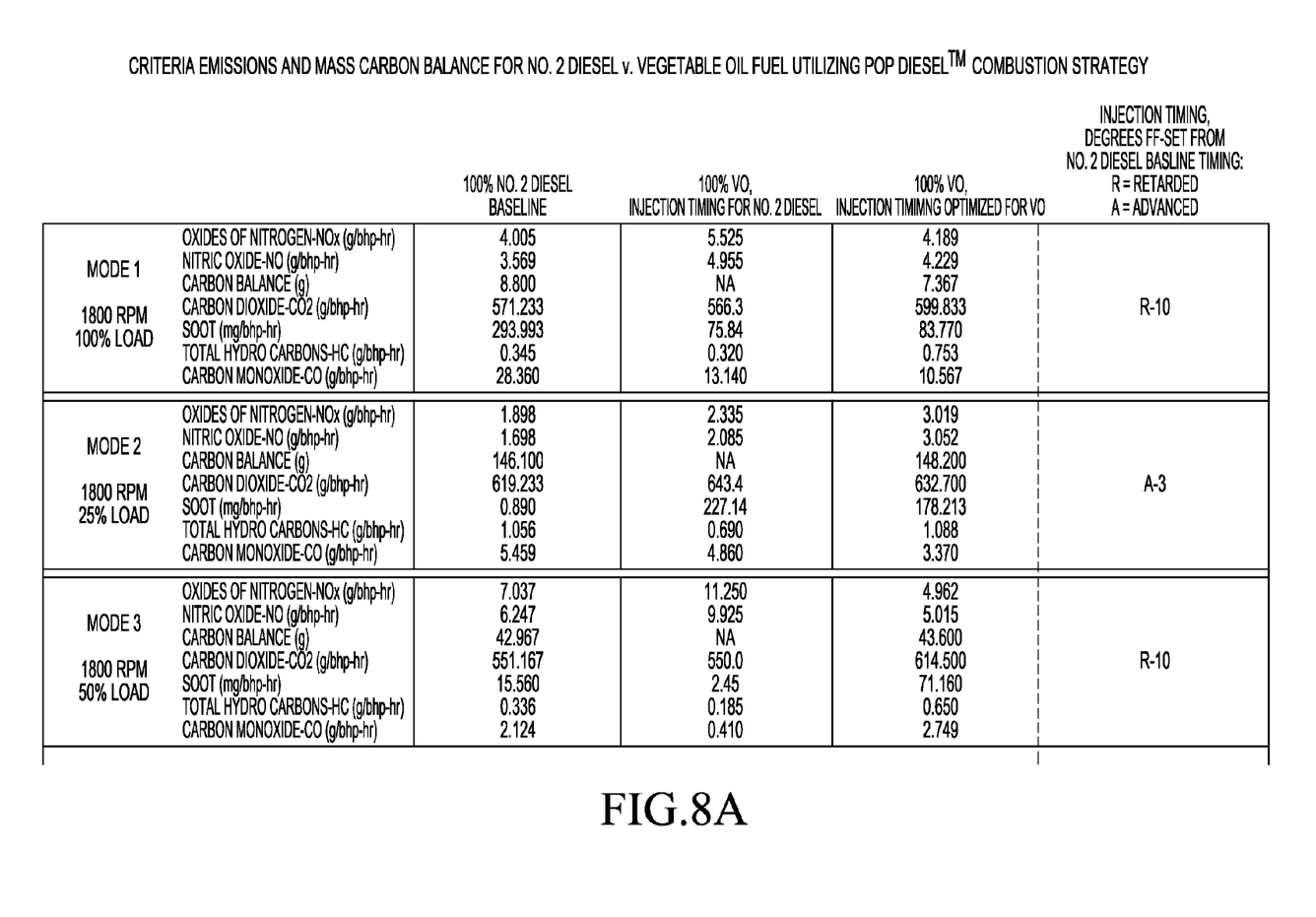
FIGS. 8A and 8B illustrate raw Criteria Emissions and Mass Carbon Balance for No. 2 diesel versus 100% vegetable or plant oil (VO) using the POP Diesel™ Combustion Strategy in a 2005 GM/Vauxhall 1.9 liter diesel engine without any exhaust after-treatment equipment installed.
Figure 8B:
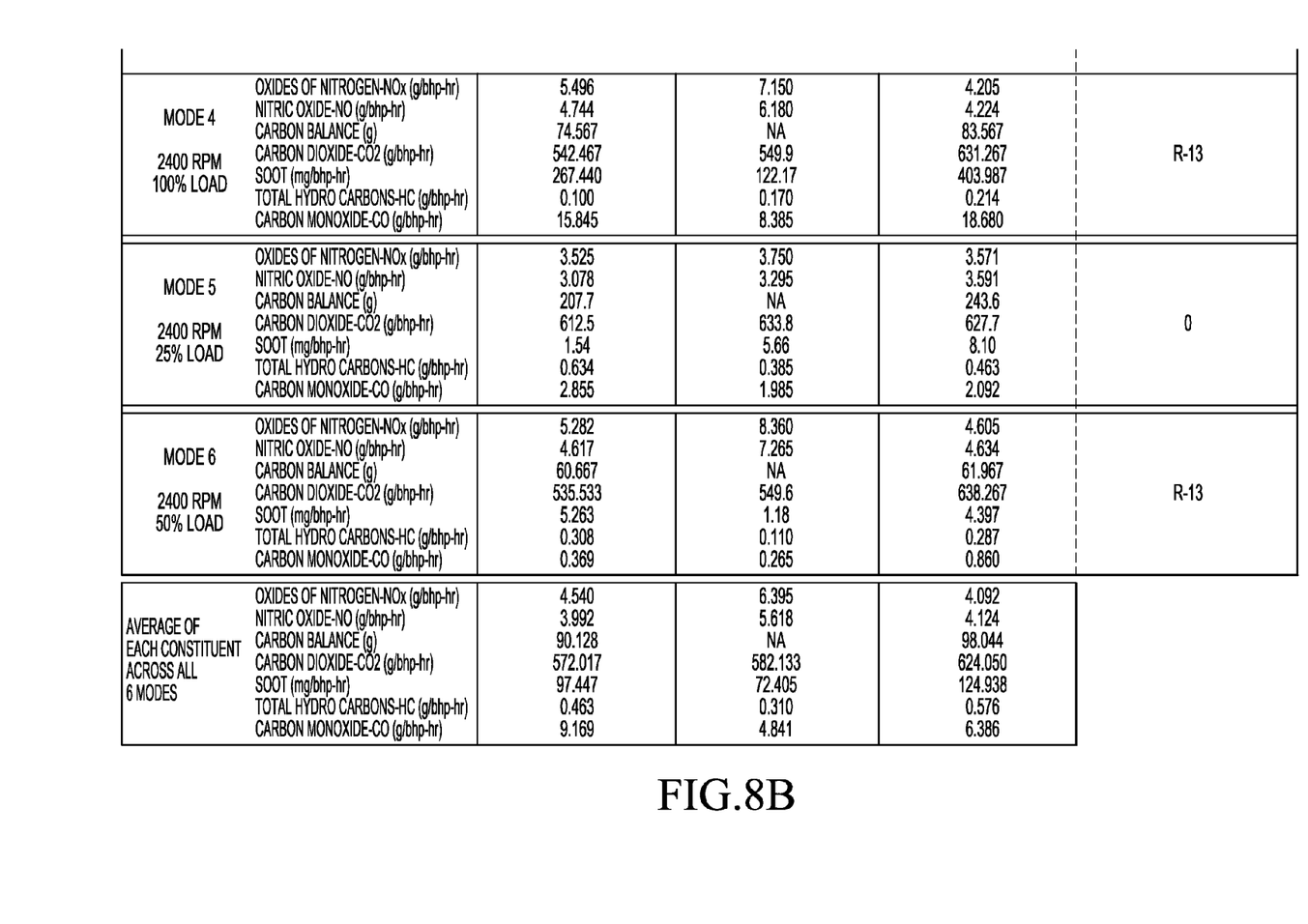

On the other hand, when the user, perhaps via the position of fuel selector valve 21, sets ECM 18 to indicate that the engine is using 100% alternative fuel, or a blend of No 2. diesel fuel and alternative fuel, the timing adjustor module 17 intercepts and revises the timing signal T0 before a signal is sent to ECM 18. Timing adjustor module 17 is programmed with control parameters 22 to contain tables corresponding to how the timing signal T0 should be replaced by a revised timing signal T1, T2, . . . Tn, for example, when either 100% alternative fuel, or a mixture or blend of alternative fuel and No. 2 diesel fuel is used in the engine, which revised timing signal is transmitted to the ECM modifier 20. The revised timing signal T1, T2, . . . Tn may change the injection timing in a range between and including 13 degrees retarded and 3 degrees advanced, or beyond this range, depending on one or more operating conditions (rpm, load, temperature, etc.) of the engine. FIGS. 8A and 8B illustrate raw Criteria Emissions and Mass Carbon Balance for No. 2 diesel versus 100% vegetable or plant oil (VO) using the POP Diesel™ Combustion Strategy in a 2005 GM/Vauxhall 1.9 liter diesel engine without any exhaust after-treatment equipment installed. As can be seen in the right hand column of FIGS. 8A and 8B, Ignition Timing (or degrees off-set from the No. 2 diesel baseline timing) ranges from 13 degrees retarded (R) to 3 degrees advanced (A) depending on the speed (revolutions per minute, or rpm) and torque (load) of the engine. Further, as can be seen in the data at the bottom of FIG. 8B, which averages the emissions data of during operating Modes 1-6 of the engine, emissions of oxides of nitrogen (NOx) are 4.092 g/bhp-hr (prior to after-treatment) when the engine in using vegetable oil (VO), which compares favorably with NOx of 4.540 g/bhp-hr (prior to after-treatment) when the engine in using No. 2 diesel. Similarly, as can be seen in the data at the bottom of FIG. 8B, average emissions of NO are 4.124 g/bhp-hr (prior to after-treatment) when the engine using vegetable oil (VO), which is only marginally higher than average emissions of nitric oxide (NO) of 3.992 (prior to after-treatment) when the engine is running on No. 2 diesel.

FIG. 7 is a flow chart depicting a method of Control Mode 2 of the fuel supply control system in accordance with the present invention. Steps S202, S204, S206, and S208 show the sequences of steps during engine control when the engine is using No. 2 diesel fuel or petroleum diesel fuel.

In Step S202, the phase adjustor module 17 is deactivated, indicating that the fuel is No. 2 diesel fuel or petroleum diesel fuel. Thus, in Step S204, the normal (baseline) timing signal T0 from sensor 16 is transmitted to the phase adjustor 17 and is not modified by the phase adjustor 17. In Step S206, the normal (baseline) timing signal T0 is transmitted to the ECM 18. Finally, in Step S208, ECM 18 transmits the normal (baseline) timing signal T0 to the fuel injector 14.

On the other hand, Steps S210, S210A, S204, S212, and S214 show the sequences of steps during engine control when the engine is using 100% alternative fuel or a mixture/blend of No. 2 diesel and alternative diesel stored in the alternative fuel tank 23.

Step S210 is a signal indicating that the fuel supply is coming from an alternate fuel tank A, B, . . . N, and phase adjustor 17 is activated. Concurrently, in Step S210A control parameters corresponding to the specific alternative fuel being used are sent to the phase adjustor 17. As a result, when in Step S204 the normal (baseline) timing signal T0 from sensor 16 is received by the phase adjustor 17, the phase adjustor 17 generates a revised timing signal T1, T2, Tn, and in Step S212 sends the revised timing signal T1, T2, Tn to ECM 18. Finally, in Step S214, ECM 18 transmits the revised timing signal T1, T2, . . . Tn to the fuel injectors 14.

The corresponding structures, materials, acts, and equivalents of all means or step plus function elements in the claims below are intended to include any structure, material, or act for performing the function in combination with other claimed elements and specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical applications, and to enable others of ordinary skill in the art to understand the invention for various embodiments with various modifications as are suited to the particular use contemplated.

What is claimed is:

1. A system for controlling exhaust emissions from a compression ignition engine capable of using multiple fuels drawn from at least two separate fuel storage tanks, the system comprising:

a crankshaft position sensor (CPS) for detecting a predetermined position of a crankshaft of the engine and sending a time signal when the position is detected, an electronic control module (ECM) for receiving an original time signal (T0) from the crankshaft position sensor (CPS) and separately signaling fuel injectors when to inject fuel into a cylinder combustion chamber in relation to when each piston is at top-dead-center in the chamber, a duration of the fuel injection (pulse), a pressure under which the fuel is injected, and a quantity of fuel injected, an electronic phase adjustor module for intercepting the original time signal (T0)-coming from the crankshaft position sensor (CPS) when the fuel supply to engine is 100% alternative fuel, or 100% mixture of alternative fuel and No. 2 diesel or petroleum diesel fuel, wherein the electronic phase adjustor is adapted to generate a revised time signal (T1, T2, ... Tn) that is either retarded or advanced from the original time signal (T0) in terms of degrees of rotation of the crankshaft, and to cause the electronic control module (ECM) to send predetermined settings corresponding to the revised timing signal (T1, T2, ... Tn) to the fuel injectors to set the timing of fuel injection when the fuel supply to engine is 100% alternative fuel, or 100% mixture of alternative fuel and No. 2 diesel or petroleum diesel fuel, so that when the engine is running on 100% alternative fuel, or 100% mixture of alternative fuel and No. 2 diesel or petroleum diesel fuel, one or more harmful emissions are minimized and reduced to a level substantially equal to or lower than a level of the one or more harmful emissions when the engine is running on only 100% No. 2 diesel or 100% petroleum diesel fuel.

2. The system for controlling exhaust emissions from a compression ignition engine according to claim 1, wherein the predetermined settings for the timing of injection of the fuel are optimized to minimize the one or more harmful emissions when the fuel supply to the engine is a particular mixture or blend consisting in part of No. 2 diesel or petroleum diesel fuel, and the remainder part being 100% alternative fuel.

3. The system for controlling exhaust emissions from a compression ignition engine according to claim 1, wherein when the attribute of the fuel is No. 2 diesel or petroleum diesel fuel, the revised time signal is the same as the original time signal (T0), and whereas when the attribute of the fuel is a particular kind or form of biofuel at 100% concentration, the revised time signal (T1, T2, ... Tn) falls within the range between and including 13 degrees retarded and 3 degrees advanced, depending on one or more operating conditions of the engine, and the revised time signal (T1, T2, ... Tn) corresponds to one of the predetermined settings for the timing of injection of fuel from the fuel injectors that minimizes the one or more harmful emissions when the fuel supply to the engine is that particular kind or norm of biofuel at 100% concentration.

4. The system for controlling exhaust emissions from a compression ignition engine according to claim 2, wherein when the attribute of the fuel is No. 2 diesel or petroleum diesel fuel, the revised time signal is the same as the original time signal (T0), and whereas when the attribute of the fuel is a mixture or blend of No. 2 diesel or petroleum diesel fuel and a particular kind or form of biofuel, the revised time signal (T1, T2, ... Tn) falls within the range of between and including 13 degrees retarded and 3 degrees advanced, depending on one or more operating conditions of the engine, and the revised time signal (T1, T2, ... Tn) corresponds to one of the predetermined settings for the timing of injection of fuel from the fuel injectors that minimizes the one or more harmful emissions when the fuel supply to the engine is the particular mixture or blend of No. 2 diesel or petroleum diesel fuel and that particular kind or form of biofuel.

5. The system for controlling exhaust emissions from a compression ignition engine according to claim 4, wherein the particular mixture or blend consists of N % No. 2 diesel or petroleum diesel fuel and (100 minus N) % of a particular kind or form of biofuel at 100% concentration.

6. The system for controlling exhaust emissions from a compression ignition engine according to claim 3, wherein the harmful emissions that are minimized are oxides of nitrogen and nitric oxide.

7. The system for controlling exhaust emissions from a compression ignition engine according to claim 5, wherein the harmful emissions that are minimized are oxides of nitrogen and nitric oxide.

8. The system for controlling exhaust emissions from a compression ignition engine according to claim 5, wherein the harmful emissions that are minimized are oxides of nitrogen, nitric oxide, soot, and particulate matter.

9. The system for controlling exhaust emissions from a compression ignition engine according to claim 1, wherein the predetermined settings for the injection of fuel from the fuel injectors to minimize the one or more harmful emissions when the fuel supply to the engine is 100% alternative fuel are determined by two or more of injection timing, the duration of the fuel injection (pulse), the pressure under which the fuel is injected, and the quantity of fuel injected.

10. The system for controlling exhaust emissions from a compression ignition engine according to claim 5, wherein when the attribute of the fuel is a particular kind or form of biofuel at 100% concentration, the predetermined settings for injection timing, the duration of the fuel injection (pulse), the pressure under which the fuel is injected, and the quantity of fuel injected are utilized that correspond to the fuel being that particular kind or form of biofuel at 100% concentration.

11. The system for controlling exhaust emissions from a compression ignition engine according to claim 5, wherein when the attribute of the fuel is a mixture of blend of No. 2 diesel or petroleum diesel and a particular kind or form of biofuel, the predetermined settings for injection timing, the duration of the fuel injection (pulse), the pressure under which the fuel is injected, and the quantity of fuel injected are utilized that correspond to the fuel being the mixture of the blend of No. 2 diesel and petroleum diesel and that particular kind or form of biofuel.

12. The system for controlling exhaust emissions from a compression ignition engine according to claim 1, wherein the electronic phase adustor module is integrated into and a part of the electronic control module (ECM).

13. The system for controlling exhaust emissions from a compression ignition engine according to claim 1, wherein the electronic phase adustor module is not integrated into the electronic control module (ECM), but is physically apart from it and communicates with it by means of electronic wires and signals.

* * * * *